United States Patent [19]

Delaporte

[11] 4,025,830
[45] May 24, 1977

[54] MOTOR CONTROL AND WEB MATERIAL DRIVE SYSTEM
[75] Inventor: Dany P. Delaporte, Lake Orion, Mich.
[73] Assignee: Computer Peripherals, Inc., Rochester, Mich.
[22] Filed: Feb. 3, 1975
[21] Appl. No.: 546,559
[52] U.S. Cl. .............................. 318/6; 318/207 R; 318/255; 318/284
[51] Int. Cl.² ......................................... H02P 1/42
[58] Field of Search ....... 318/207 R, 207 A, 207 B, 318/6, 284, 596, 626, 627, 203 A, 255

[56] References Cited
UNITED STATES PATENTS

| | | | |
|---|---|---|---|
| 3,436,632 | 4/1969 | Tisserant et al. | 318/284 X |
| 3,688,170 | 8/1972 | Karklys et al. | 318/225 R |
| 3,697,841 | 10/1972 | Nystuen | 318/225 |
| 3,818,295 | 6/1974 | Poppinger | 318/207 B |
| 3,848,165 | 11/1974 | Heiberger | 318/207 R |

Primary Examiner—B. Dobeck
Attorney, Agent, or Firm—J. T. Cavender; Wilbert Hawk, Jr.; Jeffrey P. Morris

[57] ABSTRACT

A motor switching and control circuit is disclosed in which the direction of transport of web material transferred between two reels is reversed by detecting a condition requiring reversal, generating a reversing signal in response to the detected condition, and switching the direction of rotation of an AC motor in response to the reversing signal. Both motor direction switching and reversing condition detection switching are accomplished at substantially zero motor current flowing through and zero motor voltage across the contacts of any circuit switches, thereby eliminating radio frequency interference and logical noise generation during switching. The circuit is particularly useful in connection with the ribbon control drive in an impact printer such as a matrix printer.

17 Claims, 7 Drawing Figures

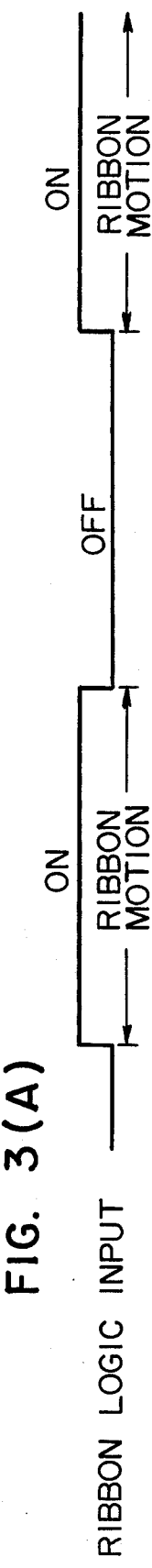
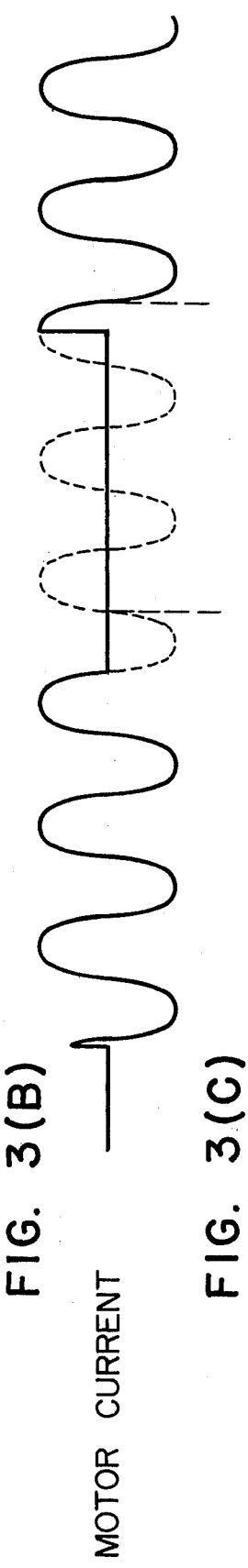
FIG. 3(A) RIBBON LOGIC INPUT
FIG. 3(B) MOTOR CURRENT
FIG. 3(C) SWITCH 32 AND 34 OPERATION
FIG. 3(D) SWITCH 32 AND 34 AND RELAY CURRENT
FIG. 3(E) MOTOR REVERSAL SWITCH 106 OPERATION

MOTOR CONTROL AND WEB MATERIAL DRIVE SYSTEM

BACKGROUND OF THE INVENTION

1. Field of the Invention

The field of the present invention relates generally to AC motor direction control and switching circuitry therefor. There are numerous applications in which the rotational direction of an AC motor is required to be reversed. One such application is impact printing, in which a printing head such as a matrix printer under computer control prints data through use of an inked ribbon upon an ink receiving medium. Either one or two motors wind ribbon on storage spools during printing to continuously expose fresh ink to the printer, which requires reversing the ribbon direction at the ends thereof by reversing the direction of rotation of the motor or motors driving the spools. Switches are actuated to detect ribbon end points which in turn cause motor current reversing switching to occur. A problem in systems of this type is that the making and breaking of the ribbon end point detecting and motor reversing switches causes arcing which in turn generates RFI and other noise and transients. This noise in systems of the prior art interferes with the low level logic voltages from the computer control which enable the printing head with consequent printing errors and sytem breakdowns.

2. Description of the Prior Art

In the prior art, elimination of RFI caused by switching transients has heretofore been attempted by means of large capacitors connected across the switches to reduce large rates of changes of voltage when switching occurs with high voltage across and current through the switch. In the present invention, switching always occurs when no such voltages or currents are present across or through the switches, thereby obviating the need for such prior art capacitors which are both expensive and potentially dangerous due to their high discharge potentials. Various other approaches taken by the prior art include the current reversal system of U.S. Pat. No. 3,611,093, in which current is rapidly reversed through an impedance element by establishing resonance therewith when current is interrupted. Another technique of the prior art is described by U.S. Pat. No. 3,432,736 in which reversal is accomplished by connecting an AC source across half of an autotransformer, with each of the autotransformer windings connected to a separate triac. The other triac terminals are connected to one phase of the motor field windings. One triac is energized to connect one end of the autotransformer to the field winding with each end being 180° out of phase.

SUMMARY OF THE INVENTION

The present invention relates to a motor control system and circuit for reversing the direction of rotation of an AC motor at predetermined intervals in response to detected external conditions such that RFI and logical noise interference is eliminated or greatly reduced. In a preferred embodiment, the ribbon control drive for a matrix printer comprises a gearmotor and a torquemotor bidirectionally and rotatably mechanically coupled to a pair of spools upon which a printing ribbon is wound for transfer therebetween. A pair of switches, each responsive to an eyelet or other means present at or near each respective end of the ribbon causes a unique ribbon control circuit to switch a latching relay which in turn reverses the motor current only when substantially no motor current flows across the latching relay contacts when substantially no current flows across the ribbon position detection switches.

The electronic control circuit comprises an SCR which is gated ON and OFF by a triac to the ribbon position detection switches such that current flows through the switches only when the switch contacts are fully closed. The triac not only serves to gate the SCR ON and OFF, but also controls the flow of current through the gearmotor such that motor reversal switching occurs only after motor current is removed. The ribbon position detecting switches operate a relay only during the period when motor current is zero and AC source current is half-wave rectified by the SCR. Since switch contacts are opened and closed when current is not flowing, arcing and its associated transients are prevented, resulting in improved interference-free electronic control.

It is therefore an object of the present invention to provide an improved AC motor control and reversal circuit in which radio frequency and logical noise interference is substantially eliminated by performing all system switching operations at substantially a zero current flow across the switches.

It is another object of the present invention to provide an improved ribbon control system in an impact printer.

It is yet another object of the present invention to provide a simplified low voltage motor reversal circuit which eliminates arcing without high voltage arc suppression circuitry.

It is yet another object of the present invention to provide an electronic control circuit for the control of ribbon reversal in a matrix printer in which electrical or mechanical contacts near the ribbon ends actuate reversal condition switches only when no voltage is present across the switch contacts.

Yet another object of the present invention is to provide thyristor control of the switching of a split phase AC motor such that removal of power from the motor by switching occurs only when no current is applied to the excitation windings thereof, preventing arcing and RFI and logic interference.

The foregoing and other objects and advantages of the invention will become apparent from the following more particular description of the preferred embodiment of the invention, as illustrated in the accompanying drawings.

BRIEF DESCRIPTION OF THE DRAWINGS

FIGS. 3(A) through 3(E) are switching and waveform diagrams associated with and in connection with the circuit of FIG. 2.

DESCRIPTION OF THE PREFERRED EMBODIMENT

Figure 1:
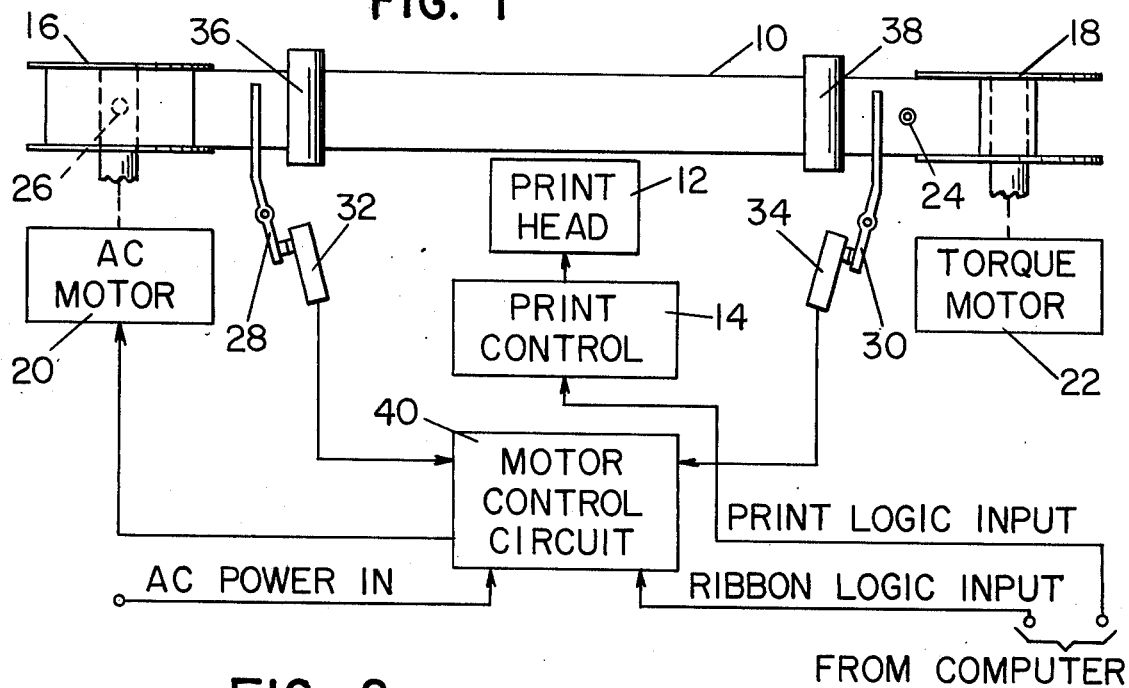
FIG. 1 is a simplified block diagram of a printer ribbon control system incorporating the present invention.

Referring now to FIG. 1, a simplified block diagram of the ribbon control and switching system of the present invention is illustrated as the ribbon reversal control for an inked ribbon bidirectionally transferable between a pair of spools, which arrangement is particularly desirable in impact printers such as matrix printers.

Matrix printers as such are well known, and produce characters in the form of a dot matrix in response to input data. A typical dot matrix printer of the prior art is described by U.S. Pat. Nos. 3,719,781 and 3,670,861, to which reference may be made for mechanical and circuit details of such printers.

An inked ribbon 10 is struck by a plurality of rods contained in a print head 12 which are arranged in a matrix to form characters upon paper which is contacted by the ribbon. The sequence of print characters and the control thereof is accomplished by printing control logic 14 under computer command, which is well known in the art and does not form a part of the present invention. It is sufficient by way of description of the present invention that the inked ribbon 10 is moved incrementally to expose new ink whenever the print head 12 operates to force portions of the ribbon against the paper upon which characters are printed. Ribbon 10 is fastened at its ends on spools 16 and 18, which spools are mechanically coupled to a gearmotor 20 and a torque motor 22 respectively, which motors rotate the spools to transfer ribbon 10 therebetween during the printing operation and also maintain tension in the ribbon. Ribbon motion is controlled solely by reversible motor 20, the characteristics of which are such that it is capable of developing substantially greater output torque than motor 22. Motor 22, which may be a simple AC or DC motor, is excited to rotate in one direction only, for example, counterclockwise and at a higher speed than motor 20 so that during counterclockwise rotation of motor 20, tension is maintained in the ribbon 10 due to the motor speed differential while during clockwise rotation of motor 20, the greater torque of motor 20 forces motor 18 to rotate in reverse, thereby operating in a stall condition, with tension maintained in ribbon 10. While the described ribbon control system is not concerned with maintaining uniform ribbon tension or velocity since such uniformity of tension and velocity is not critical in the instant matrix printer application in which approximately sixty lines per minute are serially printed, it is to be understood that the present invention is applicable to higher speed printers in which the motor speeds and torques of motors 20 and 22 may be interrelated to maintain uniformity of ribbon speed and tension.

Ribbon 10 has thereon near either end thereof a pair of eyelets 24 and 26 which contact the actuating levers 28 or 30, respectively, of ribbon reversing switches 32 and 34, respectively, to cause current reversal across the armature of motor 20, thereby reversing its direction of rotating when the ribbon 10 is nearly completely unwound from one spool to the other. Such ribbon reversal techniques are well known and will not be described in detail, it being sufficient to state that other switching arrangements may be utilized, such as the use of metal foil contacts in place of eyelets, which contacts close switches contained in the ribbon guideposts 36 and 38. Thus, it is apparent that the direction sensing switches 32 and 34 are mechanically coupled to motor 20 through the ribbon 10. A magnetic latching realy within the motor control circuitry 40 insures that the proper polarity of input power will be supplied to motor 20 when power is applied to the motor windings after said power is removed, thus effectively "memorizing" the directing of rotation, which will be described in greater detail with reference to FIG. 2. When motor 20 is turned ON and OFF during ribbon reversal and when the contacts of switches 32 and 34 are making or breaking contact, voltage and current transients would normally be generated which would produce RFI noise which would interfere with the low level logic signals from the computer. In the present invention, such transients and corresponding RFI noise is eliminated since, in accordance with the invention, the AC voltage present during switching and motor reversal is caused to become zero, hence no voltage appears across the contacts of switches 32 and 34 when the ribbon is in motion. This serves to reduce the arc suppression circuitry required by prior art systems.

Figure 2:
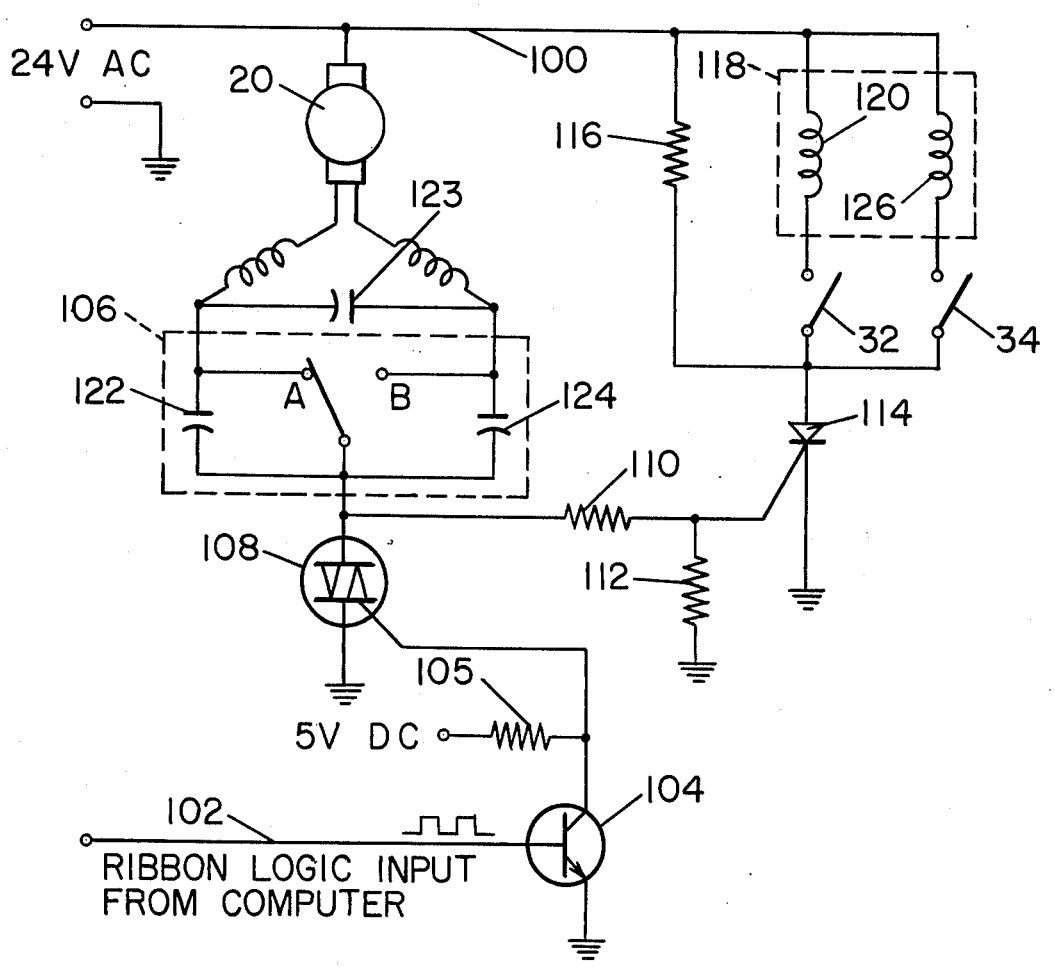
FIG. 2 is a circuit diagram of the present invention.

Referring now to FIG. 2, ribbon control electronics 40 will be described with reference to the switching diagrams of FIGS. 3(A) through 3(E).

Motor 20 is shown as a reversible split-phase AC motor, although any reversible AC motor having two excitation windings may be utilized. An isolated low AC voltage of, for example, 24 volts is applied to the armature of motor 20 via line 100. The corresponding applied motor current over a representative number of AC power cycles is shown by waveform 3(B). Operationally, a ribbon logic signal, as shown by FIG. 3(A), is coupled on line 102 from a computer or other data source to the base of gating transistor 104, which for descriptive purposes is shown as a discrete element, but which could alternately comprise part of an integrated circuit gate. When latching relay 118 switching contacts 106 are in position A as shown and ribbon switches 32 and 34 are open as shown, the logic control signal of FIG. 3(A) goes to zero, turning gate 104 OFF which permits a triac thyristor 108 to be gated ON. Gate 104 is shown coupled to a 5 volt DC logic level through resistor 105. The switch portion of relay 118, which is preferably of the magnetic type is shown at 106 in which the contact positions A and B thereof select the forward or reverse windings of split phase motor 20, with the latching function "memorizing" the winding selection from the contacts of the ribbon direction switches 32 and 34 after removal of power to the motor. Dual coil latching relay 118 may be a type R30 manufactured by Potter and Brumfield. Returning to the circuit operation, when the switches 32 and 34 and relay contacts 106 of relay 118 are in the illustrated position, motor current is coupled through relay contact position A through a voltage divider comprising resistors 110 and 112, which voltage divider couples the ON voltage of triac 108 to the gate of SCR 114. Since the triac 108 ON voltage is less than that voltage necessary to turn SCR 114 ON, SCR 114 is gated OFF and no voltage appears across open switches 32 or 34. Leakage current is supplied to SCR 114 through resistor 116 which prevents any high rate of change of voltage with respect to time across SCR 114 in the event that either switch 32 or 34 should close at or near an input voltage peak. As will be explained, such closure will not occur.

Triac 108 serves to control the current through motor 20 by turning such current OFF at the zero current crossover times shown by FIG. 3(B), and also serves to enable the SCR 114, which controls gate 104, ON near the zero crossover points of the power source, thereby controlling the application of current to relay 118 associated with switches 32 and 34. FIGS. 3(C) and 3(D) illustrate that, since SCR 114 operates as a half-wave rectifier of the AC power source for the dual-coil latching relay 118, current flows through switches 32 or 34 only when the switch contacts are fully closed, and current through relay 118 is turned OFF by SCR 114 only at the zero power crossover points. The motor current of FIG. 3(B) is shown at the zero crossover when the switches 32 and 34 are closed as shown by FIG. 3(C) and correspondingly, FIG. 3(D) illustrate SCR 114 as gated ON only when switches 32 and 34 are closed.

Considering now the closure condition of relay 118 by either switch 32 or 34, said switches, being mechanically coupled to motor 20 via ribbon 10, can be actuated only during such times and in such sequence as previously described with reference to FIG. 3. When the ribbon approaches an end thereof, an eyelet such as eyelet 24 engages the actuating arm 18 of switch 32 and closes switch 32. Since at the time of this closure of switch 32, SCR 114 is gated OFF by the low ON voltage of triac 108, which in turn insures that no voltage drop exists across the contacts of either switch 32 or switch 34, it can be appreciated that when switch 32 closes, relay 118 actuated through switch 32 is not yet operated, hence no electric noise is generated by the switch 32 closure. Consequently, arc suppression circuitry across switches 32 and 34 is not required. As long as SCR 114 is gated OFF, ribbon 10 will travel in the same direction, even after the ribbon reversal condition causes switch 32 to close, until the ribbon logic input on line 102 is changed. Switches 32 or 34 remain closed until after ribbon reversal occurs by the energizing of latching relay 118 which causes the relay switch portion 106 to switch from the A to the B position. The reversal command thus has an associated time lapse which acts as a closed loop mechanical memory.

The change of logic input on line 102, from a logical 0 to a logical 1 removes gate power from triac 108 as shown by the ribbon logic OFF condition of FIG. 3(A), and permits triac 108 to turn OFF whenever the motor current of FIG. 3(B) becomes zero, which occurs at the next zero current crossover of the input current sinusoidal waveform. It is therefore apparent that power to motor 12 is removed only when zero current is present, switch 106 switches to the B position and motor current is effectively reversed at a zero power level with consequent eliminating of transients.

Considering now in detail the sequence of events which occur when thyristor 108 turns OFF due to the above mentioned removal of power to the gate thereof, SCR 114 is gated ON through resistor 110 at the next positive going input power cycle as illustrated by FIG. 3(D). As switch 32 is already closed at this point in time as previously discussed, relay coil 120 of relay 118 is energized, but at a low instantaneous voltage on the rising sinusoidal voltage curve of FIG. 3(B) as illustrated by the dotted line thereon. Thus, the relay switch 106 switches from position A to position B to reverse the motor current, i.e., the motor direction, when gate current to SCR 114 only is coupled through contacts A and B — no motor current flows during the switching operation, as is apparent from an examination of the motor current waveform of FIG. 3(B). Capacitors 122 and 124 between triac 108 and latching relay switch contacts 106, shown as A and B respectively suppress noise resulting from the switching of the SCR 114 gate current, which, of course, is many orders of magnitude less than the motor current, which motor current is absent during switching. Capacitor 123 is the running capacitance associated with split phase motor 20. The switching of relay 118 contacts 106 from the A to the B position during the time SCR 114 is ON and motor current is OFF is illustrated by FIG. 3(E).

The next ribbon logic input command on line 102 (the second ON pulse of FIG. 3(A) which is coupled to gate 104 causes triac 108 to conduct and motive current is again applied to motor 20, as shown by the resumption of motor current by curve 3(B). Simultaneously, the gate voltage applied to the gate of SCR 114 is insufficient to turn it ON, hence SCR 114 is gated OFF, as shown by curve 3(D), at the next following zero crossing of input voltage, thereby removing power from either relay coil 120 or 126 when substantially zero current flows through either relay coil depending upon which of switches 32 or 34 is closed. The closed switch (32 or 34) will remain closed until decoupled by ribbon reversal as previously discussed, at which time the closed switch (32 or 34) is mechanically unlatched by switching arm 28 or 30, opening while no current flows through said switches. Thus, it has been described that as ribbon is transferred back and forth between reels 16 and 18 by reversing the direction of rotation of motor 20, the motor reversal switching accomplished by relay 118 and the reversal condition sensing accomplished by switches 32 and 34 always occurs at those times when no current flows through either the ribbon switch contacts or the relay contacts.

While the invention has been shown and described with reference to a preferred embodiment thereof, it will be apparent to those skilled in the art that changes in form and detail may be made therein without departure from the spirit and scope of the invention.

What is claimed is:

1. A bidirectional web material transport and control apparatus comprising:
   a. an alternating current motor having at least first and second excitation windings;
   b. an electric excitation source;
   c. first web material storage reel mechanically coupled for rotation to said alternating current motor;
   d. second web material storage reel;
   e. means mechanically coupled to said second web material storage reel for providing tension in said web material when said web material is transferred between said first and second storage reels;
   f. web position switching means actuable in response to the transferral of a predetermined length of web material either from said first reel to said second reel or from said second reel to said first reel;
   g. motor reversing switching means for coupling said excitation source to either said first or said second excitation winding of said alternating current motor in response to a control signal; and
   h. control signal generation means for delaying current flow through said web position switching means and said motor reversing switching means until the instantaneous current from said excitation source is substantially zero.

2. Apparatus in accordance with claim 1 wherein said control signal generation means includes first and second thyristors coupled between said web position switching means and said motor reversing switching means, said first thyristor being gated ON to allow current to flow through said web position switching means only when the contacts of said switching means are completely closed, and said second thyristor being gated ON to actuate said motor reversing switch and to gate ON said first thyristor when the instantaneous excitation current is substantially zero; and a gating signal source for gating said second thyristor ON and OFF.

3. Apparatus in accordance with claim 2 wherein said gating signal source is a data storage means.

4. Apparatus in accordance with claim 2 wherein said web position switching means comprises a mechanical switch and wherein said motor reversing switching means comprises a latching relay.

5. Apparatus in accordance with claim 4 wherein said web position switching means includes two switches, said switches being alternately actuated by means on said web material near either end thereof, and wherein said motor reversing switching means includes two relay coils, one of which coils is associated with one of said web position switches and the other of which coils is associated with the other of said web position switches.

6. Apparatus in accordance with claim 2 wherein said first thyristor is a silicon controlled rectifier which half wave rectifies current flowing through said web position switching means when said silicon controlled rectifier is gated ON, and wherein said second thyristor is a triac, the gate of which receives said gating signal and one terminal of which is coupled to the gate of said silicon controlled rectifier and to said motor reversing switching means.

7. Apparatus in accordance with claim 1 wherein said alternating current motor is a split phase motor.

8. Apparatus in accordance with claim 7 wherein said means for providing tension in said web material comprises an electric motor.

9. Apparatus in accordance with claim 5 wherein said web material is an inked ribbon.

10. Apparatus in accordance with claim 6 further including voltage divider means for reducing the voltage between said triac and the gate of said silicon controlled rectifier.

11. A direction reversing circuit for an alternating current motor having a forward excitation winding and a reverse excitation winding in which electrical noise associated with switching transients is substantially eliminated, comprising:
   a. a source of alternating electrical current;
   b. switching means for coupling said alternating current to either said forward or to said reverse excitation winding;
   c. means for generating a reversing signal; and
   d. control means responsive to said reversing signal for actuating said switching means only when the instantaneous alternating current coupled to said switching means is substantially zero and before stalling of said motor such that the excitation winding to which said reversing signal is coupled is electrically excited to rotate the motor oppositely to the direction in which the motor is rotating when said reversing signal is coupled thereto;
   e. said switching means including a relay which is energized when the instantaneous alternating current coupled thereto is substantially zero, and a logic input means coupled to said control means.

12. In combination:
   a. a split phase AC motor;
   b. a source of AC current;
   c. first and second switching means, said first switching means including at least one set of electrical switching contacts, operable to couple said AC current to either one or the other of the windings of said split phase motor such that said AC current is coupled thereto while said motor is rotating in a direction opposite to the direction of motor excitation of said coupled AC current, and said second switching means being operable to couple said AC current through said second switching means in response to a sensed external condition; and
   d. control means for actuating said first and second switching means only when said contacts thereof are completely closed and for making or breaking the contacts thereof only when a substantially zero voltage differential exists across the contacts thereof, thereby substantially reducing arcing across said contacts.

13. A combination in accordance with claim 12 wherein said second switching means comprises a mechanical switch.

14. A direction reversing circuit for an alternating current motor having a forward excitation winding and a reverse excitation winding in which electrical noise associated with switching transients is substantially eliminated, comprising:
   a. a source of alternating electrical current;
   b. switching means for coupling said alternating current to either said forward or to said reverse excitation winding; including a relay which is energized when the instantaneous alternating current coupled thereto is substantially zero; and a logic input means coupled to said control means;
   c. means for generating a reversing signal; and
   d. control means responsive to said reversing signal for actuating said switching means only when the instantaneous alternating current coupled to said switching means is substantially zero; including first and second thyristors, said first thyristor being gated ON to allow current to flow through said relay only when the contacts of said relay are completely closed, and said second thyristor being gated On by said logic input means to actuate said switching means and to gate ON said first thyristor when the instantaneous alternating current is substantially zero.

15. A circuit in accordance with claim 19 wherein said first thyristor is a silicon controlled rectifier which rectifies the current flowing through said relay when said SCR is gated ON, and wherein said second thyristor is a triac, the gate of which is coupled to said logic input means, and one terminal of which is coupled to the gate of said SCR and to said switching means.

16. A circuit in accordance with claim 20 wherein said switching means comprises a latching relay.

17. A circuit in accordance with claim 19 wherein said alternating current motor is a split phase motor.

* * * * *

UNITED STATES PATENT OFFICE
CERTIFICATE OF CORRECTION

Patent No. 4,025,830      Dated May 24, 1977

Inventor(s) Dany P. Delaporte

It is certified that error appears in the above-identified patent and that said Letters Patent are hereby corrected as shown below:

Claim 15, line 1, "19" should be -- 14 --.

Claim 16, line 1, "20" should be -- 15 --.

Claim 17, line 1, "19" should be -- 14 --.

*Signed and Sealed this*

*Twenty-second* Day of *November 1977*

[SEAL]

*Attest:*

RUTH C. MASON
*Attesting Officer*

LUTRELLE F. PARKER
*Acting Commissioner of Patents and Trademarks*